US012792605B2

(12) United States Patent
Sofer et al.

(10) Patent No.: US 12,792,605 B2
(45) Date of Patent: Nov. 10, 2026

(54) QUERY PERFORMANCE USING DATABASE MONITORING

(71) Applicant: INTERNATIONAL BUSINESS MACHINES CORPORATION, Armonk, NY (US)

(72) Inventors: Oded Sofer, Midreshet Ben Gurion (IL); Itai Gordon, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/666,756

(22) Filed: May 16, 2024

(65) Prior Publication Data

US 2025/0355875 A1 Nov. 20, 2025

(51) Int. Cl.
*G06F 16/2453* (2019.01)

(52) U.S. Cl.
CPC .............................. *G06F 16/24545* (2019.01)

(58) Field of Classification Search
CPC ................................................ G06F 16/24545
See application file for complete search history.

(56) References Cited

U.S. PATENT DOCUMENTS

| | | | |
|---|---|---|---|
| 7,895,191 B2 | 2/2011 | Colossi | |
| 7,933,923 B2 | 4/2011 | Ben-Natan | |
| 8,868,587 B1 | 10/2014 | Subramaniam | |
| 9,020,929 B2 | 4/2015 | Santosuosso | |
| 10,496,643 B2 | 12/2019 | Kandula | |
| 10,977,234 B2 | 4/2021 | Arye | |
| 11,030,335 B2 | 6/2021 | Rodniansky | |
| 11,341,133 B2 | 5/2022 | Sidoti | |
| 12,235,844 B1 * | 2/2025 | Ghatage | G06F 16/24545 |
| 12,248,473 B1 * | 3/2025 | Liu | G06F 16/24545 |
| 2007/0208733 A1 | 9/2007 | Brault | |
| 2018/0060394 A1 * | 3/2018 | Gawande | G06F 16/282 |
| 2020/0356568 A1 * | 11/2020 | Nawrocke | G06F 11/3006 |

FOREIGN PATENT DOCUMENTS

| | | |
|---|---|---|
| CN | 114443625 A | 5/2022 |

OTHER PUBLICATIONS

Valentino, F. "What do EverSQL Customers Think?" downloaded from https://www.eversql.com (2023), 10 pgs.
Database Query Monitoring, downloaded Feb. 5, 2024 from https://www.manageengine.com/products/applications_manager/database-query-monitoring.html#:~:text=With the database performance query, 5 pgs.

* cited by examiner

*Primary Examiner* — Aleksandr Kerzhner
*Assistant Examiner* — Samuel C Sharpless, III
(74) *Attorney, Agent, or Firm* — CHIP LAW GROUP

(57) ABSTRACT

Query performances are analyzed by creating clusters of the queries sent to a database by classifying the queries sent to the database based on one or more actions of the queries sent to the database and one or more objects of the queries sent to the database. A computing device compares a performance of queries within the clusters to identify deviating queries that deviate from cluster averages. The computing device computes optimized queries for the deviating queries by replacing the deviating queries with similar queries that meet a similarity metric or query corrections generated to modify the deviating queries.

20 Claims, 7 Drawing Sheets

500

| QUERY 502 | ACTION 504 | |
|---|---|---|
| SELECT*FROM table_name; | SELECT | 506 |
| SELECT column1, column2. FROM table_name WHERE CONDITION; | SELECT | 508 |
| INSERT INTO table_name (column1, column2) VALUES (value1, value2); | INSERT | 510 |
| INSERT INTO table_name (column1, column2) SELECT column1, column2 FROM another_table WHERE condition; | INSERT | 512 |

FIG. 5

600

| | CRITERIA 602 | DESCRIPTION 604 |
|---|---|---|
| 606 | USER/ROLE | USER OR ROLE ASSOCIATED WITH THE QUERY |
| 608 | QUERY START TIME | TIME WHEN THE QUERY WAS INTIATED |
| 610 | QUERY RESPONSE TIME | TIME TAKEN FOR THE QUERY TO EXECUTE AND RESPOND |
| 612 | RECORDS-AFFECTED | NUMBER OF RECORDS AFFECTED BY THE QUERY |
| 614 | MACHINE CONSUMPTION | RESOURCES CONSUMED BY THE MACHINE DURING QUERY |
| 616 | WHERE CLAUSE | CONDITIONS SPECIFIED IN THE WHERE CLAUSE |
| 618 | RUNNING TIME | TOTAL TIME TAKEN BY THE QUERY TO RUN |
| 620 | GROUP BY | FIELDS USED FOR GROUPING RESULTS |
| 622 | FIELDS | FIELDS SELECTED IN THE QUERY |
| 624 | ORDER OF JOIN | SEQUENCE OF TABLES JOINED IN THE QUERY |

FIG. 6

QUERY PERFORMANCE USING DATABASE MONITORING

BACKGROUND

Technical Field

The present disclosure generally relates to analyzing database queries, and more particularly, to analyzing query performances using a database monitoring system.

Description of the Related Art

Database (DB) systems can play a crucial role in various applications, serving as repositories for storing and retrieving vast amounts of structured and unstructured data. Efficient query execution is salient for extracting relevant information from databases and supporting decision-making processes and may directly impact the responsiveness and usability of these systems, particularly in scenarios involving large datasets or complex queries.

Existing approaches to query optimization typically involve static optimization techniques applied during query compilation or execution planning stages. Additionally, caching mechanisms may store frequently accessed data or query results in memory to reduce processing overhead.

BRIEF SUMMARY

According to an embodiment of the present disclosure, a computer-implemented method includes creating, by a computing device, clusters of queries sent to a database by classifying the queries sent to the database based on one or more actions of the queries sent to the database and one or more objects of the queries sent to the database. The method further includes comparing by the computing device, a performance of queries within the clusters to identify deviating queries, i.e., queries that deviate from cluster averages. The computing device computes optimized queries for the deviating queries b replacing the deviating queries with either similar queries that meet a similarity metric or query corrections generated to modify the deviating queries.

In an embodiment, the computing device generates the query modifications, in response to unsuccessful computations of the similar queries, the query modifications including removing loops, subqueries, or wildcards from the queries deviating from cluster averages.

In an embodiment, metadata of the queries sent to the database are captured and structures of the queries sent to the database are decomposed and stored in an analytics database.

According to one embodiment of the present disclosure, a computer program product includes one or more computer-readable storage devices and program instructions stored on at least one of the one or more computer-readable storage devices, the program instructions executable by a processor, program instructions to create clusters of queries sent to a database by classifying the queries sent to the database based on one or more actions of the queries sent to the database and one or more objects of the queries sent to the database; program instructions to compare a performance of queries within the clusters to identify deviating queries that deviate from cluster averages; and program instructions to compute optimized queries for the deviating queries by replacing the deviating queries with similar queries that meet a similarity metric or query modifications generated to modify the deviating queries.

According to an embodiment of the present disclosure, a computer-readable storage medium tangibly embodies a computer readable program code having computer readable instructions that, when executed, causes a computer system to create clusters of the queries sent to the database by classifying the queries sent to the database based on one or more actions of the queries sent to the database and one or more objects of the queries sent to the database; compare a performance of queries within the clusters to identify deviating queries that deviate from cluster averages; and compute optimized queries for the deviating queries by replacing the deviating queries with similar queries that meet a similarity metric or query modifications generated to modify the deviating queries.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 5 depicts a table visualizing classification of the queries based on actions in accordance with an illustrative embodiment.

FIG. 6 depicts a list for assessing query performance in accordance with an illustrative embodiment.

DETAILED DESCRIPTION

Overview

Figure 1:
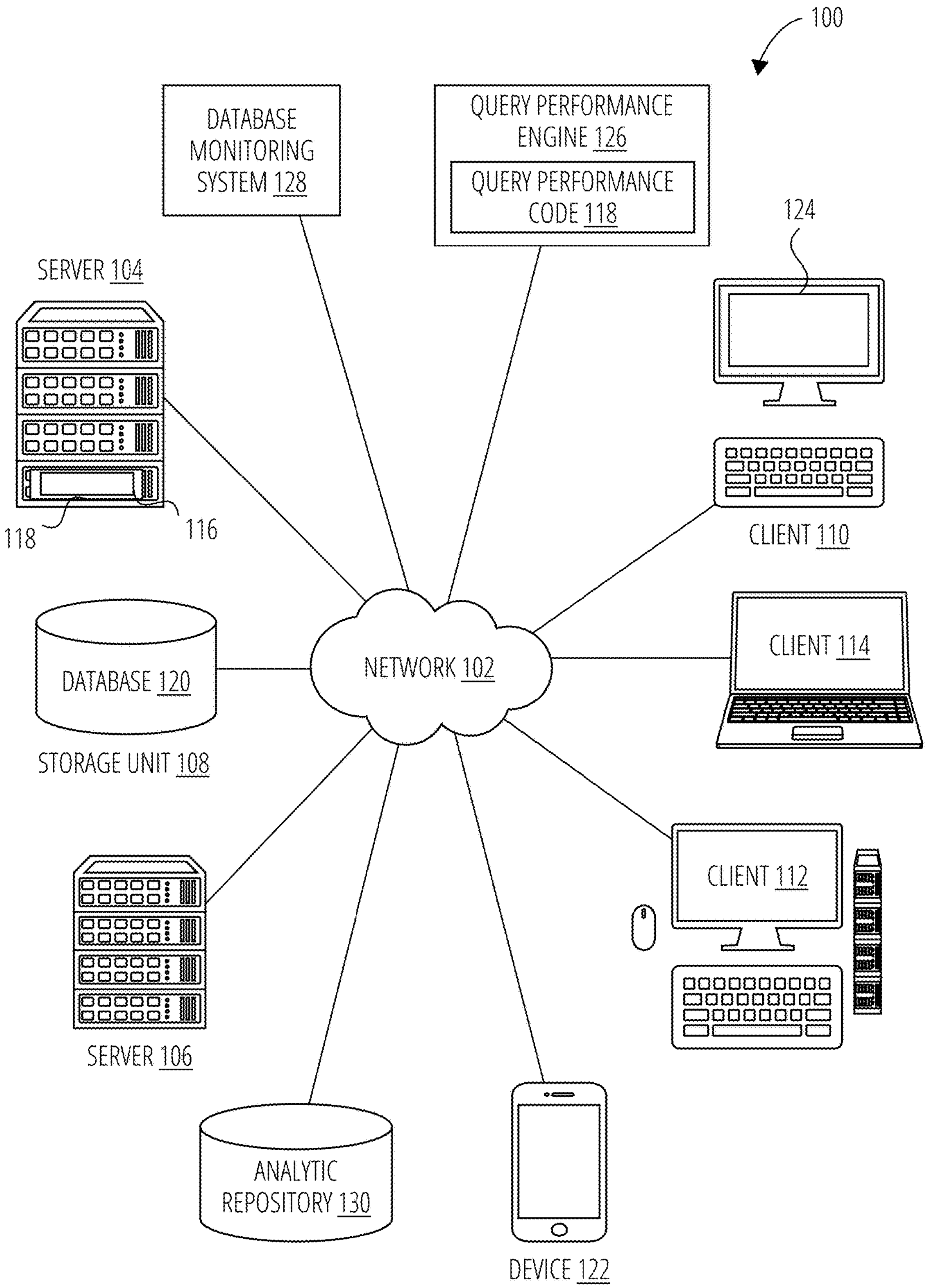
FIG. 1 depicts a block diagram of a network of data processing systems in accordance with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

It is recognized that building a database system that meets all of the needs of an entity is a difficult feat to achieve. Creating a database, data warehouse, or big data system that caters to all user reports across various customers can become unfeasible. Different operators may have unique use cases, and unique local computing environment and operators not fully comprehend the impact of search criteria. It is recognized that some operators may attempt to anticipate main use cases, but reality may surpass predictions, leading to dynamic use cases that debug and logging mechanisms may not always address. For instance, a system may be optimized for certain queries but struggle with others, potentially overloading a database system and disrupting critical tasks.

Further, though queries may be developed and tested in testing environments to meet predetermined passing criteria, the same queries may underperform in production environments due to differences in the user specific computing environments used.

Embodiments of the present disclosure generally relate to analyzing query performances using a database monitoring system by intercepting queries, including obtaining their metadata and decomposed structures. By creating clusters of queries based on actions and objects, the present disclosure enables systematic organization and comparison of similar queries in a clustering approach that aids in identifying patterns and anomalies in query performance. In one aspect, the present disclosure effectively identifies queries that deviate from cluster averages in terms of performance metrics such as response time, records affected, and computational load. Based on the comparison of query performance, query component modifications or other queries that meet a similarity metric but have better relative performance may be suggested to an operator ensuring tailored optimizations to improve query efficiency.

Overall, embodiments offer a systematic and proactive approach to analyze, optimize, and manage query performance in diverse database environments, addressing the challenges posed by dynamic use cases, varying data volumes, and evolving user behaviors.

Certain operations are described as occurring at a certain component or location in an embodiment. Such locality of operations is not intended to be limiting on the illustrative embodiments. Any operation described herein as occurring at or performed by a particular component, can be implemented in such a manner that one component-specific function causes an operation to occur or be performed at another component, e.g., at a local or remote engine respectively. In one aspect, the method described herein, is implemented to execute on a particularly configured computing device or data processing system and provides substantial advancement of the functionality of that computing device or data processing system. Embodiments thus have the capacity to improve the technical field of analyzing query performances using a database monitoring system.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably processed manually by a human user.

The illustrative embodiments are described with respect to certain types of machines. The illustrative embodiments are also described with respect to other scenes, subjects, measurements, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures, therefore, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Example Data Processing Environment

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Client 110, client 112, client 114 are also coupled to network 102. A data processing system, such as clients (client 110, client 112, client 114), query performance engine 126 device 122, database monitoring system 128, and an analytic repository 130 may include data and may have software applications or software tools executing thereon. Server 104 and server 106 may include one or more GPUs (graphics processing units) for statistical analysis or machine learning.

Only as an example, and without implying any limitation to such architecture, FIG. 1 depicts certain components that are usable in an example implementation of an embodiment. For example, servers and clients are only examples and not to imply a limitation to a client-server architecture. As another example, an embodiment can be distributed across several data processing systems and a data network as shown, whereas another embodiment can be implemented on a single data processing system, which are all within the scope of the illustrative embodiments.

Data processing systems (query performance engine 126, server 104, server 106, client 110, client 112, client 114, device 122, database monitoring system 128, and analytic repository 130) also represent example nodes in a cluster, partitions, and other configurations suitable for implementing an embodiment.

Server 104, server 106, storage unit 108, client 110, client 112, client 114, device 122, query performance engine 126 may couple to network 102 using wired connections, wireless communication protocols, or other suitable data connectivity. Client 110, client 112 and client 114 may be, for example, personal computers or network computers.

In the depicted example, the servers may provide data, such as boot files, operating system images, and applications to client 110, client 112, and client 114. Client 110, client 112 and client 114 may be clients to servers in this example. Client 110, client 112 and client 114 or some combination thereof, may include their own data, boot files, operating system images, and applications. Data processing environment 100 may include additional servers, clients, and other devices that are not shown. Server 104 may include a server application 116 that may be configured to implement one or more of the functions described herein in accordance with one or more embodiments. Server application 116, client application 124 and/or query performance engine 126 may include query performance code 118 configured for analyzing query performance. In some embodiments, the query performance engine 126 may be or form a part of a server or client described herein.

The Database monitoring system 128 may intercept queries into the database 120 along with metadata, and decomposed structures of the queries.

Device 122 is an example of a device described herein. For example, device 122 can take the form of a smartphone, a tablet computer, a laptop computer, client 110 in a stationary or a portable form, or any other suitable device. Any software application described as executing in another data processing system in FIG. 1 can be configured to execute in device 122 in a similar manner. Any data or information stored or produced in another data processing system in FIG. 1 can be configured to be stored or produced in device 122 in a similar manner. Database 120 of storage unit 108 may store one or more term data samples for computations herein. Analytic repository 130 may store the queries intercepted by database monitoring system 128 along with the metadata, and decomposed structures of the queries.

The data processing environment 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 200 includes an example of an environment for the execution of at least some of the computer code involved in performing the inventive methods, such as query performance code 118. In addition to the query performance code 118, computing environment 200 includes, for example, Computer 202, wide area network 228 (WAN), end user device 230 (EUD), remote server 232, public cloud 240, and private cloud 236. In this embodiment, Computer 202 includes processor set 204 (including processing circuitry 206 and cache 208), communication fabric 210, volatile memory 212, persistent storage 214 (including operating system 216 and the query performance code 118, as identified above), peripheral device set 218 (including user interface (UI) device set 220, storage 222, and Internet of Things (IoT) sensor set 224), and network module 226. Remote server 232 includes remote database 234. Public cloud 240 includes gateway 238, cloud orchestration module 242, host physical machine set 246, virtual machine set 244, and container set 248.

Figure 2:
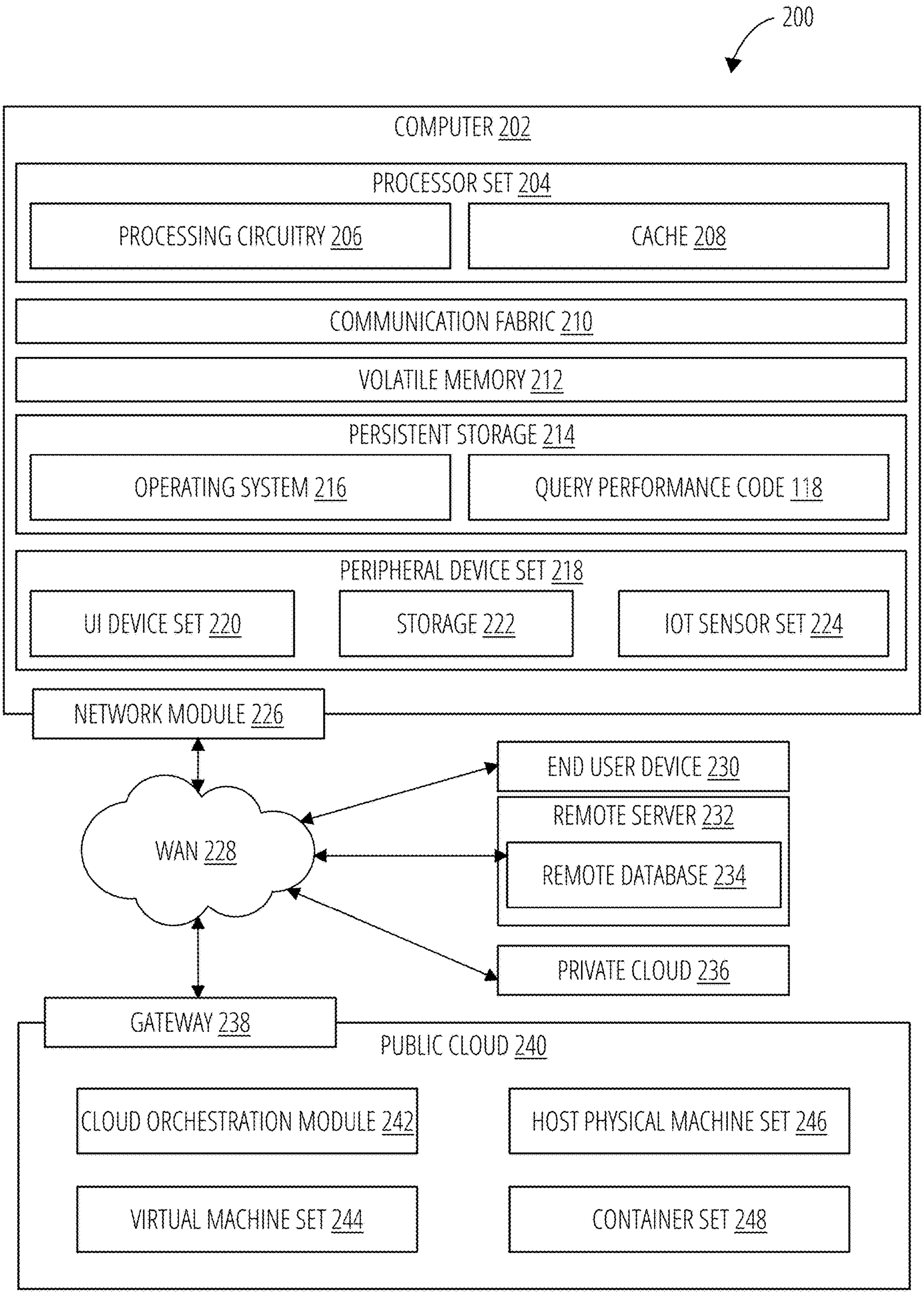
FIG. 2 depicts a block diagram of a computing environment in accordance with an illustrative embodiment.

Computer 202 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 234. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically Computer 202, to keep the presentation as simple as possible. Computer 202 may be located in a cloud, even though it is not shown in a cloud in FIG. 2. On the other hand, Computer 202 is not required to be in a cloud except to any extent as may be affirmatively indicated.

Processor set 204 includes one, or more, computer processors of any type now known or to be developed in the future. Processing circuitry 206 may be distributed over multiple packages, for example, multiple, coordinated integrated circuit chips. Processing circuitry 206 may implement multiple processor threads and/or multiple processor cores. Cache 208 is memory that is located in the processor chip package(s) and is typically used for data or code that should be available for rapid access by the threads or cores running on processor set 204. Cache memories are typically organized into multiple levels depending upon relative proximity to the processing circuitry. Alternatively, some, or all, of the cache for the processor set may be located "off chip." In some computing environments, processor set 204 may be designed for working with qubits and performing quantum computing.

Computer readable program instructions are typically loaded onto Computer 202 to cause a series of operational steps to be performed by processor set 204 of Computer 202 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 208 and the other storage media discussed below. The program instructions, and associated data, are accessed by processor set 204 to control and direct performance of the inventive methods. In computing environment 200, at least some of the instructions for performing the inventive methods may be stored in the query performance code 118 in persistent storage 214.

Communication fabric 210 is the signal conduction path that allows the various components of Computer 202 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In Computer 202, the volatile memory 212 is located in a single package and is internal to Computer 202, but, alternatively or additionally, the volatile memory may be distributed over multiple packages and/or located externally with respect to Computer 202.

Persistent storage 214 is any form of non-volatile storage for computers that is now known or to be developed in the future. The non-volatility of this storage means that the stored data is maintained regardless of whether power is being supplied to Computer 202 and/or directly to persistent storage 214. Persistent storage 214 may be a read only memory (ROM), but typically at least a portion of the persistent storage allows writing of data, deletion of data and re-writing of data. Some familiar forms of persistent storage include magnetic disks and solid-state storage devices. Operating system 216 may take several forms, such as various known proprietary operating systems or open-source Portable Operating System Interface-type operating systems that employ a kernel. The code included in the query performance code 118 typically includes at least some of the computer code involved in performing the inventive methods.

Peripheral device set 218 includes the set of peripheral devices of Computer 202. Data communication connections between the peripheral devices and the other components of Computer 202 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 220 may include components such as a display screen, speaker, microphone, wearable devices (such as goggles and smart watches), keyboard, mouse, printer, touchpad, game controllers, and haptic devices. Storage 222 is external storage, such as an external hard drive, or insertable storage, such as an SD card. Storage 222 may be persistent and/or volatile. In some embodiments, storage 222 may take the form of a quantum computing storage device for storing data in the form of qubits. In embodiments where Computer 202 is required to have a large amount of storage (for example, where Computer 202 locally stores and manages a large database) then this storage may be provided by peripheral storage devices designed for storing very large amounts of data, such as a storage area network (SAN) that is shared by multiple, geographically distributed computers. IoT sensor set 224 is made up of sensors that can be used in Internet of Things applications. For example, one sensor may be a thermometer and another sensor may be a motion detector.

Network module 226 is the collection of computer software, hardware, and firmware that allows Computer 202 to communicate with other computers through WAN 228. Network module 226 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 226 are performed on the same physical hardware device. In other embodiments (for example, embodiments that utilize software-defined networking (SDN)), the control functions and the forwarding functions of network module 226 are performed on physically separate devices, such that the control functions manage several different network hardware devices. Computer readable program instructions for performing the inventive methods can typically be downloaded to Computer 202 from an external computer or external storage device through a network adapter card or network interface included in network module 226.

WAN 228 is any wide area network (for example, the internet) capable of communicating computer data over non-local distances by any technology for communicating computer data, now known or to be developed in the future. In some embodiments, the WAN 228 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 230 is any computer system that is used and controlled by an end user (for example, a customer of an enterprise that operates Computer 202) and may take any of the forms discussed above in connection with Computer 202. EUD 230 typically receives helpful and useful data from the operations of Computer 202. For example, in a hypothetical case where Computer 202 is designed to provide a recommendation to an end user, this recommendation would typically be communicated from network module 226 of Computer 202 through WAN 228 to EUD 230. In this way, EUD 230 can display, or otherwise present, the recommendation to an end user. In some embodiments, EUD 230 may be a client device, such as thin client, heavy client, mainframe computer, desktop computer and so on.

Remote server 232 is any computer system that serves at least some data and/or functionality to Computer 202. Remote server 232 may be controlled and used by the same entity that operates Computer 202. Remote server 232 represents the machine(s) that collect and store helpful and useful data for use by other computers, such as Computer 202. For example, in a hypothetical case where Computer 202 is designed and programmed to provide a recommendation based on historical data, then this historical data may be provided to Computer 202 from remote database 234 of remote server 232.

Public cloud 240 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 240 is performed by the computer hardware and/or software of cloud orchestration module 242. The computing resources provided by public cloud 240 are typically implemented by virtual computing environments that run on various computers making up the computers of host physical machine set 246, which is the universe of physical computers in and/or available to public cloud 240. The virtual computing environments (VCEs) typically take the form of virtual machines from virtual machine set 244 and/or containers from container set 248. It is understood that these VCEs may be stored as images and may be transferred among and between the various physical machine hosts, either as images or after instantiation of the VCE. Cloud orchestration module 242 manages the transfer and storage of images, deploys new instantiations of VCEs and manages active instantiations of VCE deployments. Gateway 238 is the collection of computer software, hardware, and firmware that allows public cloud 240 to communicate through WAN 228.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 236 is similar to public cloud 240, except that the computing resources are only available for use by a single enterprise. While private cloud 236 is depicted as being in communication with WAN 228, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 240 and private cloud 236 are both part of a larger hybrid cloud.

Example Architecture

Figure 3:
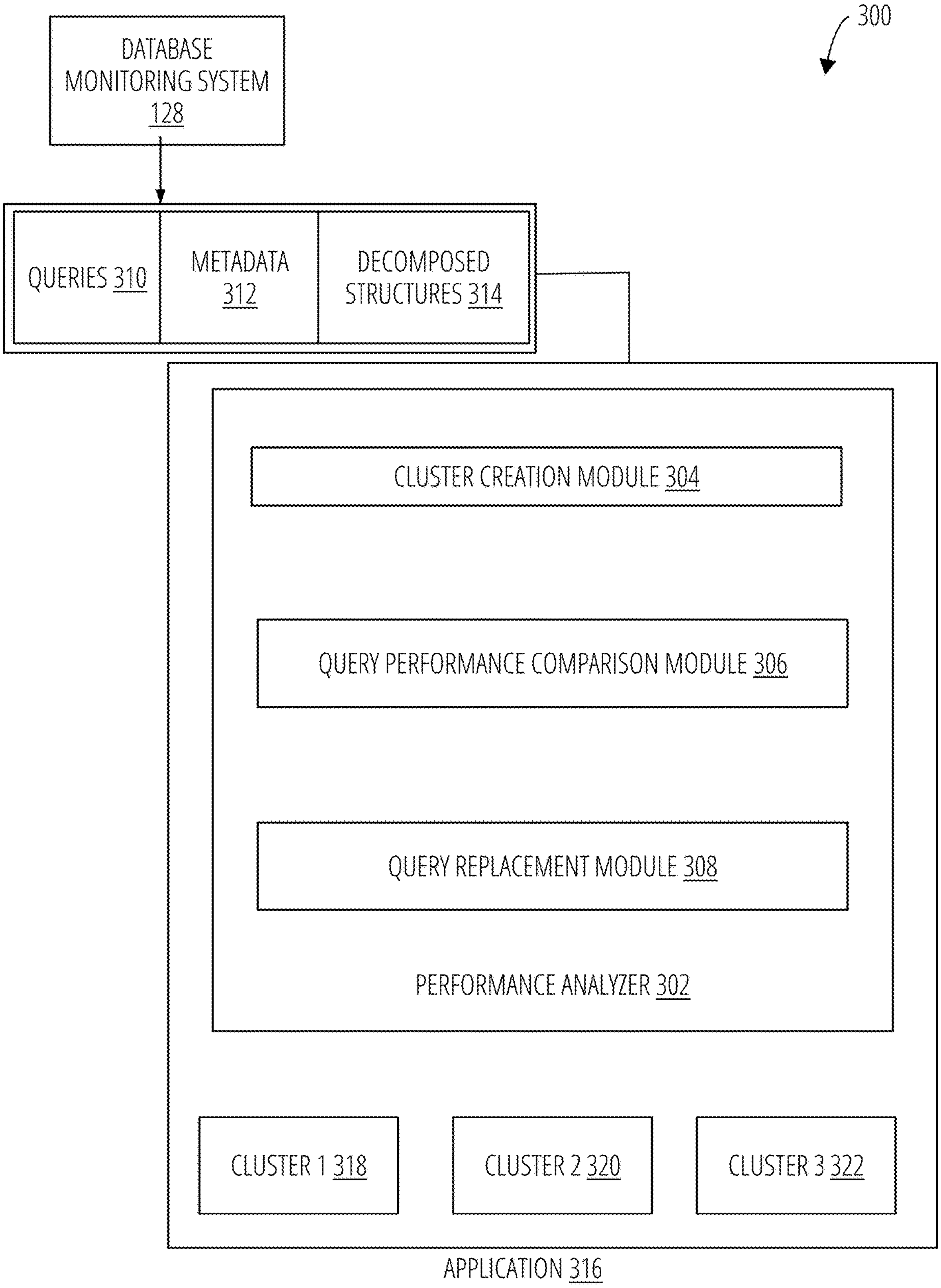
FIG. 3 depicts a block diagram of the architecture of an application in accordance with an illustrative embodiment.

Reference now is made to FIG. 3, which illustrates a block diagram 300 of the architecture of an application 316 in which a query analysis may be performed. The application 316 may be operated based on query performance code 118 or query performance engine 126 for query performance analysis. The application 316 may include a performance analyzer 302, which may be built on top of a log of the database monitoring system 128. The performance analyzer 302 may further include or operate a cluster creation module 304, a query performance comparison module 306, and a query replacement module 308. The performance analyzer 302 may perform or be controlled by a controller to perform one or more operations described herein.

In embodiments, a database monitoring system 128 may intercept queries 310, and may additionally capture corresponding metadata 312 of the queries, and compute decomposed structures 314 of the queries 310 as described herein. Intercepting the queries 310 by the database monitoring system 128 may be performed while simultaneously ensuring that the database continues to function. In an embodiment, the database monitoring system 128 may structure the intercepted queries 310 to trees or SQL skeletons of objects or actions such as, for example, a tree of table/cmd/fields/group-by/order, etc. The intercepted queries may be a large plurality of queries intercepted to for historical analysis of the root cause of query performance issues, responsive to which real time and/or non-real time mitigation procedures may be performed. In an embodiment, the metadata 312 of the intercepted queries may include, but is not limited to, logs of a user/role, query start-time, query response-time, records-affected (number of records in the results of that have been updated/inserted) and machine computational costs, etc. Upon obtaining the metadata 312 and decomposed structures 314, the database monitoring system 128 may store the intercepted queries 310, along with metadata 312, and decomposed structures 314 of the queries 310 on a repository such as the analytic repository 130.

Figure 4:
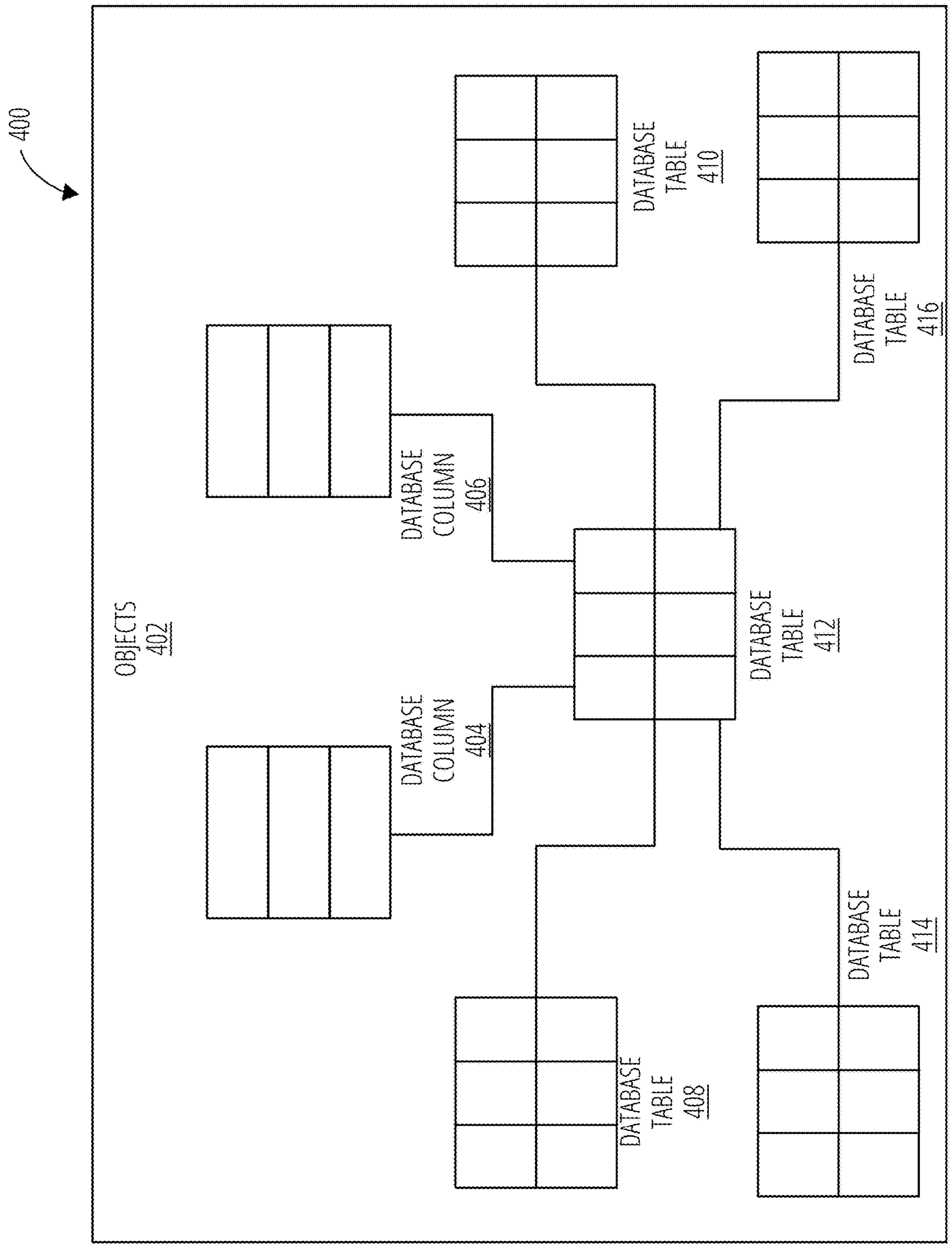
FIG. 4 depicts a block diagram visualizing classification of the queries based on objects in accordance with an illustrative embodiment.

The cluster creation module 304 of the application 316 may be configured to create a plurality of clusters of the queries, for example, cluster 318, cluster 320, and cluster 322 by classifying the intercepted queries 310 based on one or more actions of the queries 310 and one or more objects of the queries 310. FIG. 4-FIG. 5 illustrate example clustering of queries based on one or more objects or one or more actions associated with the queries. For example, FIG. 4 illustrates a block diagram 400 visualizing clustering of the queries based on objects 402, in accordance with an illustrative embodiment. In the embodiment, the intercepted queries 310 may be classified based on the one or more objects 402 by categorizing the queries 310 into database columns 404, 406 or database tables 408, 410, 412, 414, and 416. Likewise, reference FIG. 5 illustrates a table 500 visualizing clustering of the queries based on actions in accordance with an illustrative embodiment. The intercepted queries 310 may be clustered based on the one or more actions 504 by categorizing the queries 310 as select 506, 508 or insert 510, 512 queries. Of course, these examples are not meant to be limiting as other clusters such as more complex clusters may be obtained in view of the descriptions here.

Turning back to FIG. 3, the query performance comparison module 306 may compare the performance of the queries within the clusters to identify queries deviating from cluster averages (deviating queries). More specifically, the query performance comparison module 306 may search for queries that fail to meet a proper run criteria (for example, queries that run slower than a predetermined number of second N, or queries that overloaded the database system), search for queries that ran in parallel to the queries meeting the improper run criteria and check the history of all queries to identify a "bad" query, i.e., a query that deviates from a corresponding cluster average.

For the queries deviating from cluster averages, similar queries (queries that meet a similarity metric such as a similarity in meaning, a similarity in query components or queries that perform the same tasks) may be computed to identify properties that cause differences in performance. In some embodiments, prior to computing the similarities, the queries deviating from cluster averages may be computed by profiling all queries to find potential performance issues. In an example, logged information about queries may be used in the profiling, such as obtaining the average/minimum/maximum/variance of response time information, obtaining records-affected information, and computational load information for every distinct query.

FIG. 6 illustrates a list 600 showing example criteria 602 and corresponding descriptions 604 of query information that can be logged, including but not limited to user/role 606, query start time 608, query-response time 610, records-affected 612, machine computational consumption 614, where clause 616, running time 618, group by 620, fields 622, and order of join 624, etc. In the example, the structure of every query may be matched with an ID based on a corresponding SQL skeleton and the queries may be grouped according to the objects of the queries in use such as a table, view, or synonym. Subsequently, queries that run improperly are identified and compared with the similar queries to identify the query components that cause the differences in performance. By obtaining the skeletons (trees of tables, commands, fields, etc.) a clustering process can be performed on the skeletons to group the skeletons to higher levels. A decision tree algorithm may then be run on all queries of the same cluster to identify the impact of skeleton-variation on the response time or computational load. This may aid in providing proposals for replacement or correction of queries associated with computational performances that fail to meet a predetermined pass criterion.

In an embodiment, the profiling of queries to identify potential performance issues may include, for example in the case of slow Select*, specifying specific columns by scanning a history of the queries to find equivalent queries that specify the exact columns and comparing runtime. A comparison of Response time of Select* vs Select-specific-columns (min-max-var-avg) may be provided.

In an embodiment, a check may be performed to identify a loop in query structure, responsive to which the history may be scanned to find alternate queries that perform similar actions without a loop in query structure. Runtimes (min-max-var-avg) may then be compared. Responsive to alternate queries not being found, an operator may alternatively be alerted to recommend best-practice queries.

In an embodiment, queries that use subqueries may be tagged as being potentially problematic queries. Queries that use wildcards may be tagged as being potentially problematic queries especially if a "%" symbol is a prefix.

In an embodiment, queries in which a result is greater than a threshold of rows "N rows" may be tagged as being potentially problematic queries and may be grouped to ranges. Queries in which the term "HAVING" is used instead of the term "WHERE" may be tagged as being potentially problematic queries.

In an embodiment, all queries executed where time range is used (example queries in which the term "between" and other similar syntax for time range where clauses) may be tagged to profile the impact of time ranges. A check may be performed for whether queries are accessing fields which are indexed or not indexed if there is an access to a table configuration.

In an embodiment, the customization of strings may be enabled to search in the history and profiling matching queries (for example, all queries where matching "% COUNT (*) %" based on predetermined syntax may be obtained and profiled). Of course, these are examples and are not meant to be limiting as other examples may be obtained in view of the descriptions herein.

Turning back to FIG. 3, upon identifying the deviating queries, the query replacement module 308 may be used to replace the deviating queries with optimized queries that have desired performances such as the similar queries that meet the predetermined similarity metric or query modifications that are generated to modify the deviating queries into queries associated with a desired performance. In an embodiment, the replacement may be performed in non-real time, where in a dashboard of query runtime analysis may be provided to an operator to learn about usability, and automatic suggestions options. Recommendations for improvements may thus be provided in the form of a report for manual or automated non-real time replacement. Alternatively, real-time automated suggestions options may be provided to an operator wherein auto-suggest helpers can be injected into application 316 when a potential issue is observed.

Thus, new queries may be temporarily blocked from execution responsive to which replacements may be suggested for automated execution or for manual acceptance. Even further, old queries may be mapped to new queries. Ideally, by methods described herein, use of the query performance engine 126 may enable to interception and replacement of database queries without changing or affecting underlying application code.

Figure 7:
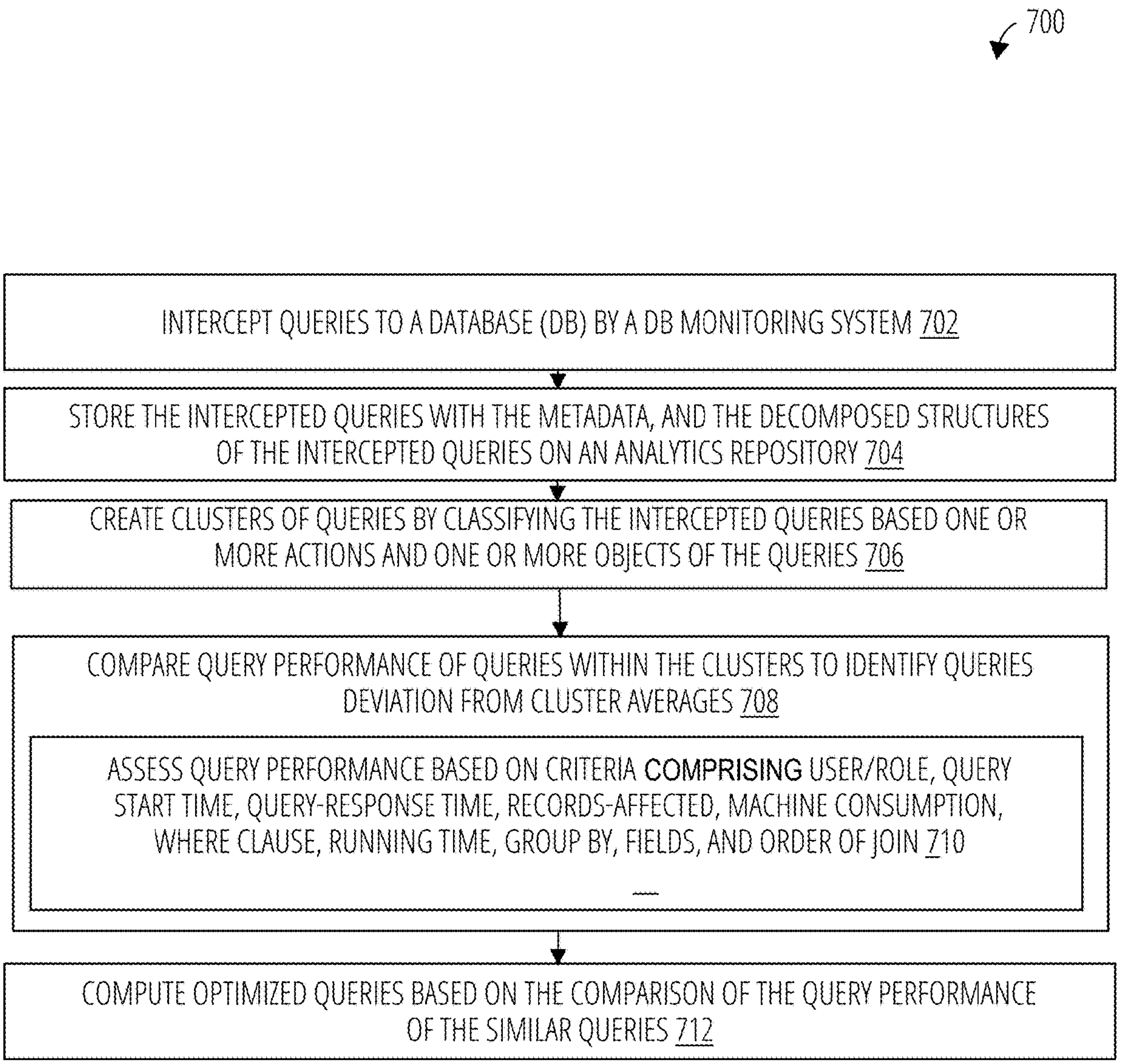
FIG. 7 depicts a routine in accordance with an illustrative embodiment.

Turning now to FIG. 7, a routine 700 for analyzing query performance using query performance engine 126 is disclosed in accordance with an illustrative embodiment. In block 702, queries to database 120 may be intercepted by the database monitoring system 128. In block 704, the intercepted queries may be stored with the metadata 312, and the decomposed structures of the intercepted queries on an analytics repository.

In block 706, clusters of queries may be created by classifying the intercepted queries based on one or more actions and one or more objects of the queries. For example, the queries may be classified based on the one or more actions by categorizing the queries as select or insert queries, or other examples of actions. The queries may also be classified based on the one or more objects by categorizing the queries as tables, columns, or other objects.

In block 708, the performance of queries within the clusters may be compared to identify queries deviating from cluster averages. In sub-block 710, performance of the similar queries may be assessed based on criteria selected from a list comprising user/role, query start time, query-response time, records-affected, machine consumption, where clause, running time, group by, fields, or order of join.

In block 712, optimized queries may be computed and used as replacement for the deviating queries based on, for example, the computations of queries that meet a similarity criterion or based on modification of query components. The optimized queries may be suggested in real time or in non-real time and may be used to manually or automatically replace the deviating queries.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits, and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for improving query performance, the computer-implemented method comprising:

intercepting, by a computer processor, a first plurality of queries sent to a database while the database continues to function;

capturing, by the computer processor, metadata for each query of the first plurality of queries, wherein the metadata includes a query response time of each query of the first plurality of queries;

classifying, by the computer processor, the first plurality of queries based on one or more actions of the first plurality of queries and one or more objects of the first plurality of queries;

creating, by the computer processor, clusters of the first plurality of queries based on the classifying of the first plurality of queries;

determining, by the computer processor, a respective cluster average of each cluster of the clusters based on the metadata, wherein each cluster of the clusters includes a respective second plurality of queries of the first plurality of queries, and the respective cluster average corresponds to a performance metric associated with an average query response time of the respective second plurality of queries;

comparing, by the computer processor and with the respective cluster average, a performance of each query of the respective second plurality of queries within a cluster of the clusters;

identifying, by the computer processor, based on the comparing, one or more deviating queries from the respective second plurality of queries within the cluster, wherein the one or more deviating queries deviate from the respective cluster average in excess of a threshold associated with the respective cluster average;

running, by the computer processor, a decision tree algorithm on the respective second plurality of queries;

identifying, by the computer processor and based on the running of the decision tree algorithm, an impact of an SQL skeleton-variation between the respective second plurality of queries on the query response time of each query of the respective second plurality of queries; and generating, by the computer processor, optimized queries for the one or more deviating queries based on the identified impact.

2. The computer-implemented method of claim 1, wherein the generating of the optimized queries comprises replacing the one or more deviating queries with similar queries that meet a similarity metric, or query modifications generated to modify the one or more deviating queries.

3. The computer-implemented method of claim 2, wherein the similarity metric is selected from the group consisting of a predetermined degree of similarity in meaning, a predetermined degree of similarity in query components, and a predetermined degree of similarity in query tasks performed.

4. The computer-implemented method of claim 2, further comprising:

modifying, by the computer processor, based on the similar queries not being computed, the one or more deviating queries, wherein the modifying of the one or more deviating queries comprises one or more of the following: removing loops, subqueries, or wildcards from the one or more deviating queries.

5. The computer-implemented method of claim 1, further comprising:

intercepting, by the computer processor, the first plurality of queries by utilizing a database monitoring system; and decomposing, by the computer processor, structures of the first plurality of queries intercepted by the database monitoring system.

6. The computer-implemented method of claim 5, further comprising:

storing, by the computer processor, in an analytics repository, the first plurality of queries intercepted by the database monitoring system; and storing, by the computer processor, the metadata and the decomposed structures in the analytics repository.

7. The computer-implemented method of claim 1, wherein the classifying of the first plurality of queries comprises categorizing the first plurality of queries as select or insert queries.

8. The computer-implemented method of claim 1, wherein the classifying of the first plurality of queries comprises categorizing the first plurality of queries as database columns or database tables.

9. The computer-implemented method of claim 1, further comprising:

determining, by the computer processor, an average minimum, an average maximum, or an average variance of query response times of the respective second plurality of queries, wherein the query response times include the query response time;

identifying, by the computer processor, one or more records affected by each query of the respective second plurality of queries; and determining, by the computer processor, a computational load for each query of the respective second plurality of queries.

10. The computer-implemented method of claim 8, wherein the one or more deviating queries cause the database to run in a way that fails to meet a proper run criteria or that overload the database.

11. The computer-implemented method of claim 1, further comprising comparing, by the computer processor, the performance by:

assessing the first plurality of queries within the clusters based on criteria selected from a group consisting of a user/role, a query start time, a records-affected, a machine computational cost, a where clause, a running time, a group by clause, one or more fields, and an order of join.

12. The computer-implemented method of claim 2, further comprising:

adding, by the computer processor, the metadata to the optimized queries during the replacing of the one or more deviating queries.

13. A computer program product for improving query performance, the computer program product comprising:

one or more computer-readable storage devices; and program instructions stored on the at least one of the one or more computer-readable storage devices to perform operations comprising:

intercepting a first plurality of queries sent to a database while the database continues to function;

capturing metadata for each query of the first plurality of queries, wherein the metadata includes a query response time of each query of the first plurality of queries;

classifying the first plurality of queries based on one or more actions of the first plurality of queries and one or more objects of the first plurality of queries;

creating clusters of the first plurality of queries based on the classifying of the first plurality of queries;

determining a respective cluster average of each cluster of the clusters based on the metadata, wherein each cluster of the clusters includes a respective second plurality of queries of the first plurality of queries, and the respective cluster average corresponds to a performance metric associated with an average query response time of the respective second plurality of queries;

comparing, with the respective cluster average, a performance of each query of the respective second plurality of queries within a cluster of the clusters;

identifying based on the comparing, one or more deviating queries from the respective second plurality of queries within the cluster, wherein the one or more deviating queries deviate from the respective cluster average in excess of a threshold associated with the respective cluster average;

running a decision tree algorithm on the respective second plurality of queries;

identifying, based on the running of the decision tree algorithm, an impact of an SQL skeleton-variation between the respective second plurality of queries on the query response time of each query of the respective second plurality of queries; and generating optimized queries for the one or more deviating queries based on the identified impact.

14. The computer program product of claim 13, wherein the generating of the optimized queries comprises replacing the one or more deviating queries with similar queries that meet a similarity metric, or query modifications generated to modify the one or more deviating queries.

15. The computer program product of claim 14, wherein the operations further comprise:

modifying, based on the similar queries not being computed, the one or more deviating queries, wherein the modifying of the one or more deviating queries comprises one or more of the following: removing loops, subqueries, or wildcards from the one or more deviating queries.

16. The computer program product of claim 13, wherein the operations further comprise:

intercepting the first plurality of queries by utilizing a database monitoring system; and decomposing structures of the first plurality of queries intercepted by the database monitoring system.

17. The computer program product of claim 16, wherein the operations further comprise:

storing, in an analytics repository, the first plurality of queries intercepted by the database monitoring system; and storing the metadata and the decomposed structures in the analytics repository.

18. The computer program product of claim 13, wherein the operations further comprise:

determining an average minimum, an average maximum, or an average variance of query response times of the respective second plurality of queries, wherein the query response times include the query response time;

identifying one or more records affected by each query of the respective second plurality of queries; and determining a computational load for each query of the respective second plurality of queries.

19. The computer program product of claim 13, wherein the operations further comprise:

comparing the performance by:

assessing the first plurality of queries within the clusters based on criteria selected from the group consisting of a user/role, a query start time, a records-affected, a machine computational cost, a where clause, a running time, a group by clause, one or more fields, and an order of join.

20. A computer system for improving query performance, the computer system comprising:

a processor;

a memory, in communication with the processor, with one or more computer program instructions stored on the memory, the computer program instructions when executed by the processor cause the processor to perform one or more operations, the operations comprising:

intercepting a first plurality of queries sent to a database while the database continues to function;

capturing metadata for each query of the first plurality of queries, wherein the metadata includes a query response time of each query of the first plurality of queries;

classifying the first plurality of queries based on one or more actions of the first plurality of queries and one or more objects of the first plurality of queries;

creating clusters of the first plurality of queries based on the classifying of the first plurality of queries;

determining a respective cluster average of each cluster of the clusters based on the metadata, wherein each cluster of the clusters includes a respective second plurality of queries of the first plurality of queries, and the respective cluster average corresponds to a performance metric associated with an average query response time of the respective second plurality of queries;

comparing, with the respective cluster average, a performance of each query of the respective second plurality of queries within a cluster of the clusters;

identifying, based on the comparing, one or more deviating queries from the respective second plurality of queries within the cluster, wherein the one or more deviating queries deviate from the respective cluster average in excess of a threshold associated with the respective cluster average;

running a decision tree algorithm on the respective second plurality of queries;

identifying, based on the running of the decision tree algorithm, an impact of an SQL skeleton-variation between the respective second plurality of queries on the query response time of each query of the respective second plurality of queries; and generating optimized queries for the one or more deviating queries based on the identified impact.

* * * * *